Nov. 19, 1968  R. E. SCHWYN ETAL  3,412,359

THERMOPROBE ASSEMBLY

Filed Dec. 8, 1966

INVENTORS
Raymond E. Schwyn &
John W. Riddel
Peter P. Kozak
ATTORNEY

United States Patent Office 3,412,359
Patented Nov. 19, 1968

3,412,359
THERMOPROBE ASSEMBLY
Raymond E. Schwyn, Flint, and John W. Riddel, Fenton, Mich., assignors to General Motors Corporation, Detroit, Mich., a corporation of Delaware
Filed Dec. 8, 1966, Ser. No. 600,243
5 Claims. (Cl. 338—30)

ABSTRACT OF THE DISCLOSURE

This invention relates to a thermoprobe assembly, and more particularly to a thermoprobe having a thermistor assembly therein. The thermoprobe assembly has a fast temperature response resulting from the construction of the temperature-sensitive end thereof. The bottom of the temperature-sensitive end of the thermoprobe assembly is a nickel disc which seals the end of outer tubular shell. Inside the thermoprobe assembly a film of thermistor material is bonded to the face of the nickel disc by means of an insulative, adherent layer of nickel oxide. The thermistor film is connected electrically to the outer shell by one contact and by a second contact to a thermogauge which indicates the temperature by measuring the resistance of the thermistor film between the two contacts. The use of a film of thermistor material results in the thermistor element having a fast temperature response that can be operated over a broad power level range. This construction also provides good thermal transfer characteristics between the nickel disc portion of the outer casing and the thermistor element.

---

Figure 1:
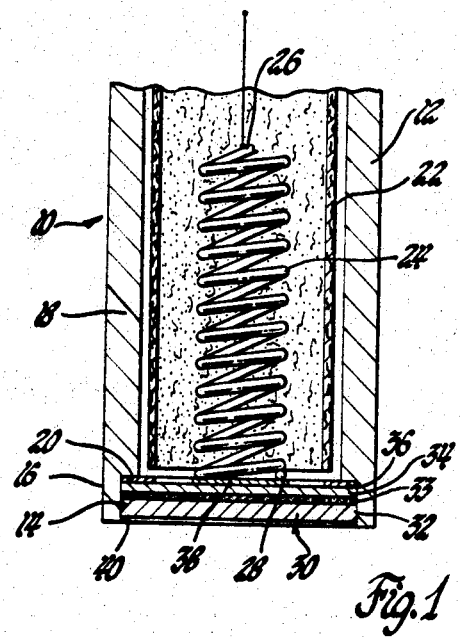

Thermoprobes having a thermistor therein as the temperature-sensitive element are used in connection with measuring the temperature of water in automobile engines, diesel engines, boilers, processing equipment, and the like. Thermistors which are conventionally used in thermoprobes of this type are in the form of a disc or rod having a metallic coating on the face thereof which comes in contact with the bottom of the thermoprobe shell or casing. Thermistor material has low conductivity and this causes the temperature response of a thermistor in these thermoprobes to be inversely proportional to the mass of the thermistor; that is, the greater the mass of the thermistor disc, the slower the temperature response. As a result, these thermoprobes have the disadvantage of having a slow temperature response due to the poor thermal transfer between the thermistor disc and the shell and due to the slow temperature response of the thermistor disc.

It is an object of this invention to provide an improved thermoprobe assembly having a fast temperature response. It is another object of this invention to provide a thermoprobe assembly having a fast temperature response that can be operated over a broad power level range. It is still another object of this invention to provide a thermoprobe assembly having good thermal transfer characteristics between the outer casing and the thermistor element.

These and other objects are accomplished by a thermoprobe assembly wherein the bottom of the temperature-sensitive end of the thermoprobe shell is a nickel disc which has a thermistor film bonded to the inner face of the disc. The thermistor film is electrically insulated from the nickel disc by a thin layer of nickel oxide. The thermistor film has silver contacts printed thereon which are in electrical contact with the thermogauge which measures the change in resistance and to the outer shell or casing of the thermoprobe assembly. When the thermoprobe assembly is immersed in a liquid medium to measure its temperature, the nickel disc rapidly transfers the heat to or away from the thermistor film which is bonded thereto. The small mass of the thermistor film permits the thermistor film to have a fast temperature response. The small mass of the thermistor film and the fast heat transfer between the nickel disc and the thermistor result in a thermoprobe assembly having a much faster temperature response than prior art thermoprobes having thermistor devices therein.

Other objects and advantages of this invention will be apparent from the following detailed description, reference being made to the accompanying drawings wherein a preferred embodiment of this invention is shown.

Figure 2:
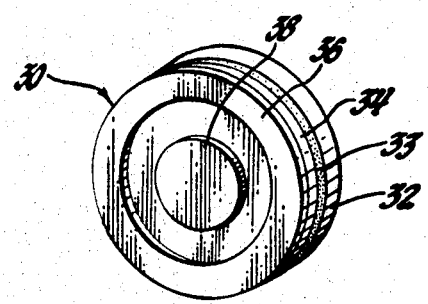

In the drawings:

FIGURE 1 is a cross-sectional view of the lower end of the thermoprobe assembly in accordance with this invention; and FIGURE 2 is a view in perspective of the thermistor assembly used in the thermoprobe.

Referring to FIGURE 1 of the drawings, the thermoprobe assembly 10 has a tubular metal shell 12. The shell 12 is formed with a centerbore having a lower portion 14 at the temperature-sensitive end 16 of relatively large diameter, and an upper portion 18 of smaller diameter which are connected by shell centerbore ledge 20. The shell 12 is formed of a ferrous metal as is common with this type of thermoprobe. Brass is also a preferred metal for the shell due to its high conductivity. Other metals such as stainless steel alloys may be used for the shell. Positioned within the upper portion 18 of the tubular shell 12 in spaced relationship therewith is a tubular insulator 22. The insulator 22 is made of paper as is the practice in the art with this type of thermoprobe. Other types of insulator materials such as ceramic, glass, insulative resins, and the like, may be used to make the tubular insulator 22. Positioned vertically within the insulator 22 is a conventional thermoprobe contact spring 24. Contact spring 24 has an end 26 which is in electrical contact with a thermogauge (not shown) and a second end 28. The primary purpose of the tubular insulator 22 is to prevent the spring 24 from making electrical contact with the shell 12. Although a tubular insulator is the preferred way to keep the spring from touching the shell, other means such as filling the space in the shell with a non-conductive material, such as alumina may be employed.

A thermistor assembly 30 in the form of a thermistor coated nickel disc is inserted into the centerbore 16 so that the thermistor is in electrical contact with the shell centerbore ledge 20. The thermistor assembly 30, as shown more clearly in FIGURE 2, has a supporting nickel substrate 32. On top of the nickel substrate 32 is a thin, adherent layer of nickel oxide 33. On top of the nickel oxide layer 33 is a thermistor film 34, the film 34 being insulated from and bonded to the nickel substrate 32 by the nickel oxide layer 33. An annular conductive metal ring 36 and conductive metal disc 38 are bonded to the top of the thermistor film 34. The annular ring 36 and the disc 38 are the two electrical silver contacts that are printed on the thermistor film. Other conductive metals such as platinum-gold, platinum and other commercially available contact metals may be used. The annular ring 36 makes electrical contact with the shell 12 at the centerbore ledge 20. The disc 38 makes electrical contact with the end 28 of the contact spring 24. The thermogauge (not shown) measures the resistance of the thermistor film 34 that is between contacts 36 and 38. The thermistor assembly 30 which fits snugly in the centerbore 14 is attached to the shell 12 by soldering the edge 40 of the disc 30.

The thermistor assembly 30 requires a nickel substrate 32 containing 98% or more nickel as the supporting member. Nickel is the only metal member that can be used since it forms an adherent, insulative metal oxide. The thickness of the nickel substrate can vary over a wide range say, for example, 2 to 100 mils. The nickel oxide insulative layer 33 is essential in this thermistor assembly because it bonds the thermistor to the nickel substrate as well as insulating these two layers. The thickness of the nickel oxide layer varies from .1 to 2 mils with a preferred thickness of the nickel substrate can vary over a wide thickness greater than 2 mils are not as adherent and have a tendency to flake off the nickel substrate. Thicknesses of the nickel oxide layer less than .1 mil do not provide adequate electrical insulation between the thermistor and the nickel substrate. An additional metal oxide insulative layer between the nickel oxide layer and the thermistor film such as an equal molar composition of zinc oxide, manganese oxide and iron oxide can be used if more insulation is desired. The thermistor film 34 is an equal molar composition of cobalt oxide, manganese oxide and cupric oxide. Other suitable commercial themistor compositions may be employed. The thermistor films are 1 to 10 mils thick and have a resistance of the order of 200 to 14,000 ohms at 77° F., a thermistor resistance which is suitable for use in many gauges which are operated at low voltages. The preferred thickness of this thermistor film is 3 to 6 mils. Thermistor films which are greater than 10 mils tend to slow the temperature response of the thermistor assembly due to the low conductivity of the thermistor material. Thermistor films of less than 1 mil have a resistance which is too high for the thermistor assembly to be operative at low voltages. The large surface area of the thermistor film for a given mass of thermistor material permits the rapid dissipation of heat. This rapid dissipation of heat by the thermistor film permits the use of the thermoprobe assembly where the power generated is above 1 watt as well as in thermoprobes where the power supply is below 1 watt.

The thermistor assembly 34 is prepared by applying a thin layer of thermistor material onto the top of a nickel substrate. The coated nickel substrate is then heated to a temperature sufficient to oxidize the surface of the nickel substrate to nickel oxide. During this heating step, the sintered thermistor material reacts with and combines with the nickel oxide layer to bond the thermistor film to the nickel substrate and at the same time insulate the thermistor material from the nickel substrate. The annular ring 36 and the disc 38 are made of silver and are printed on the thermistor in the conventional manner. The thermistor assembly 30 and the method of preparing it is described in detail in our copending application Ser. No. 600,230, filed concurrently herewith.

The thermoprobe assembly described in this invention has a fast temperature response. The fast temperature response of the thermoprobe assembly is primarily due to two things. One of these is the fast response of the thermistor which is the result of the small mass of thermistor material used in forming the thermistor film. The other reason is the fast thermal transfer between the nickel substrate 32 and the thermistor film 34 which is due to the fact that these two layers are intimately bonded to each other. When the temperature-sensitive end 14 of the thermoprobe assembly is subjected to a temperature change, the nickel substrate 32 and the thermistor 34 quickly attain the new temperature of the surrounding medium. The temperature change affects the resistance of the thermistor 34 and the electric current going through the spring 24 through the disc 38 through the thermistor 34 through the annular contact ring 36 to the shell 12 is measured by the thermogauge (not shown) which indicates the temperature.

The low conductivity of thermistor material does not slow the temperature response of this thermoprobe assembly because the thermistor film utilizes only a small mass of thermistor material. In addition, the ability of the thermistor film to equilibrate to the same temperature of the nickel substrate in such a short time because it is bonded thereto, results in an accurate and speedy temperature response for the thermoprobe assembly described herein.

While the invention has been described in terms of a specific embodiment, it is to be understood that the scope of the invention is not limited thereby except as defined in the following claims.

What is claimed is:

1. A thermoprobe assembly having a fast temperature response to be used in combination with a thermogauge comprising an outer tubular metal shell having an open end, a nickel disc sealingly connected to and closing said open end having an inner surface and forming the temperature-sensitive end of said thermoprobe assembly, a layer of adherent nickel oxide on said inner surface of said nickel disc, a thin layer of thermistor material on top of said nickel oxide layer, said nickel oxide layer bonding said thermistor material to and insulating said thermistor material from said nickel disc, a first electrical contact on said layer of thermistor material adapted to be electrically connected to said thermogauge, and a second electrical contact on said layer of thermistor material connected electrically to said shell whereby changes in the temperature of said nickel disc rapidly change the resistance of said layer of thermistor material between said two thermistor electrical contacts as measured by said thermogauge.

2. A thermoprobe assembly as described in claim 1 wherein said thermistor material contains cobalt oxide and manganese oxide.

3. A thermoprobe assembly as described in claim 1 wherein said nickel oxide layer is from 0.1 to 2 mils thick.

4. A thermistor assembly as described in claim 1 wherein said layer of thermistor material is from 1 to 10 mils thick.

5. A thermoprobe assembly having a fast temperature response to be used in combination with a thermogauge comprising an outer tubular metal shell having an open end, said shell having a stepped centerbore therethrough providing a ledge therein, a nickel disc sealingly connected to said ledge thereby closing said open end, said nickel disc having an inner surface and forming the temeprature-sensitive end of said thermoprobe assembly, a layer of adherent nickel oxide on said first face of said nickel disc, a thin layer of thermistor material on top of said nickel oxide layer, said nickel oxide layer bonding said layer of thermistor material to and insulating said layer of thermistor material from said nickel disc, a first electrical contact on said layer of thermistor material, a second electrical contact on said layer of thermistor material connected electrically to said shell, a cylindrical insulator positioned within said shell, and a contact spring having a first end adapted to be connected electrically to said thermogauge and a second end connected electrically to said first thermistor electrical contact positioned vertically in said cylindrical insulator whereby changes in the temperature of said nickel disc rapidly changes the resistance of said layer of thermistor material between said two thermistor electrical contacts as measured by said thermogauge.

References Cited

UNITED STATES PATENTS 2,961,625 11/1960 Sioh.
3,044,296 7/1962 Boddy.
3,353,124 11/1967 Dilger.

FOREIGN PATENTS 772,266 4/1957 Great Britain.

REUBEN EPSTEIN, *Primary Examiner.*

UNITED STATES PATENT OFFICE
CERTIFICATE OF CORRECTION

Patent No. 3,412,359

November 19, 1968

Raymond E. Schwyn et al.

It is certified that error appears in the above identified patent and that said Letters Patent are hereby corrected as shown below:

Column 3, line 6, "of the nickel substrate can vary over a wide" should read -- being .5 to 1 mil. Nickel oxide layers having a --. Column 4, line 44, "temeprature-sensitive" should read -- temperature-sensitive --.

Signed and sealed this 24th day of March 1970.

(SEAL)
Attest:

Edward M. Fletcher, Jr.
Attesting Officer

WILLIAM E. SCHUYLER, JR.
Commissioner of Patents